July 3, 1923.
H. W. YOUNG
PLUMB AND LEVEL
Filed Dec. 21, 1920
1,460,741
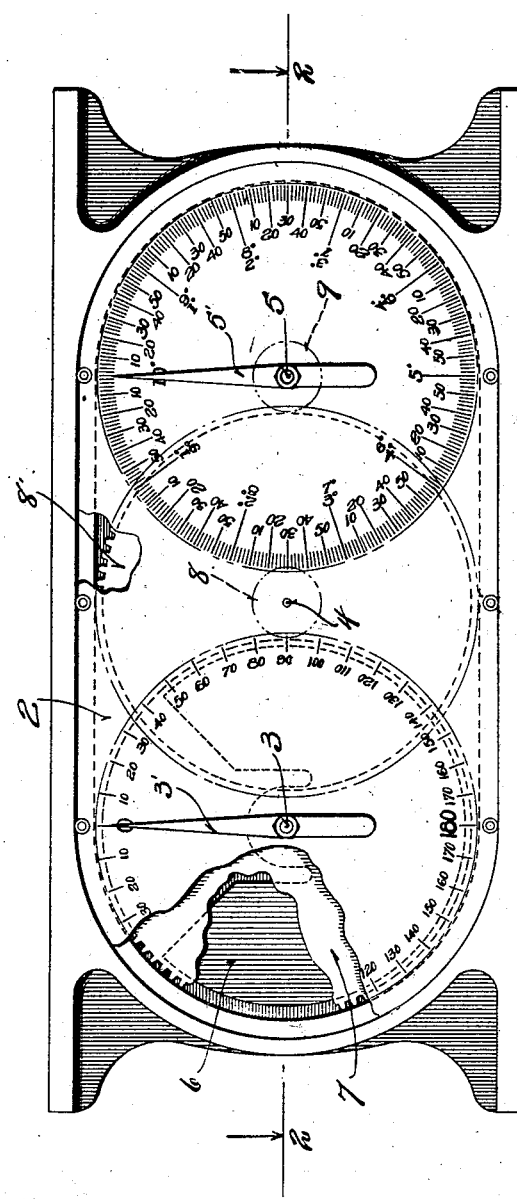
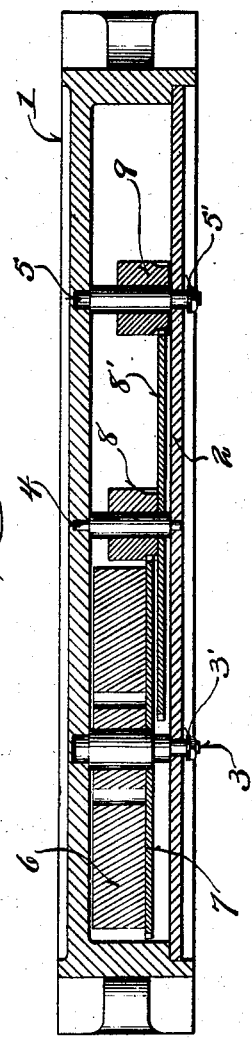
Inventor
Harry W. Young
Witness
Robert E. Weber
By Young and Young
Attorneys Patented July 3, 1923.

1,460,741

UNITED STATES PATENT OFFICE.

HARRY W. YOUNG, OF MILWAUKEE, WISCONSIN, ASSIGNOR OF ONE-HALF TO WALTER FISCHER, OF MILWAUKEE, WISCONSIN.

PLUMB AND LEVEL.

Application filed December 21, 1920. Serial No. 432,209.

*To all whom it may concern:*

Be it known that I, HARRY W. YOUNG, a citizen of the United States, and resident of Milwaukee, in the county of Milwaukee and State of Wisconsin, have invented certain new and useful Improvements in Plumbs and Levels; and I do hereby declare that the following is a full, clear, and exact description thereof.

My invention relates to a new and improved plumb and level and more particularly to one which may also be used in measuring the angle of inclination of a sloping surface.

The primary object of the invention is to provide an instrument of this character by means of which the reading may be determined with greater accuracy and to a higher degree of precision than can be effected with the instruments heretofore constructed.

The specific object of my invention is to provide a base member having a primary dial and a secondary dial, the primary dial having a gravity controlled pointer, which pointer is connected to a pointer carried by the secondary dial, through a multiple gear train, whereby the indices upon the primary dial are accurately reproduced upon the secondary dial upon a magnified scale.

With the above and other minor objects in view, the invention consists in certain peculiarities of construction and combination of parts, as are hereinafter described with reference to the accompanying illustration and subsequently claimed.

In the drawings:

Figure 1 represents a face view of a plumb or leveling instrument embodying the features of my invention with parts broken away to more clearly illustrate details of construction.

Figure 2 is a longitudinal sectional view of the same, the section being indicated by line 2—2 of Figure 1.

Referring by characters to the drawings, 1 represents a base member which, in this exemplification, is hollowed out to form a gear casing, the same being closed by a face plate 2. The rear wall of the base and the face plate form journal bearings for a gravity controlled primary arbor 3, an intermediate arbor 4 and a secondary or minute hand arbor 5.

The primary arbor 3 has secured thereto a weight 6, which weight carries a fine toothed main gear wheel 7. The main gear wheel meshes with an intermediate pinion 8, which pinion is mounted on the intermediate shaft 4, that carries an intermediate gear wheel 8', the same meshing with a pinion 9 that is secured to the minute hand arbor 5. The face plate 2 has arranged concentric with the arbor 3 a primary dial having ten degree subdivisions of graduations thereon, and said face plate is also formed with a secondary dial concentric with the arbor 5 and showing minute subdivisions of finer graduations. The main arbor 3 carries the pointer 3', which is associated with the primary dial and the secondary arbor 5 carries a minute hand or pointer 5' that is associated with the secondary dial.

From the foregoing description, it is obvious that when the base member is permitted to rest upon a body which may have a slight inclination, that this inclination will cause the gravity-controlled, primary pointer to be deflected from its normal zero position with relation to the associated dial, and owing to the multiplying gear train connection between this primary arbor and the minute hand arbor, the said minute hand or pointer 5' will be deflected to a greater degree than the primary pointer, which degree is determined by the ratio of the gear connection. Thus, the angle of deflection indicated by the primary dial is increased or magnified to a predetermined degree, whereby it can be readily read off from the secondary dial, which shows minute subdivisions. The principles embodied in the instruments shown may be employed in various forms for accomplishing micrometric determination of angular deflections.

While I have shown and described a preferred exemplification of my invention, it is understood that I may, without departing from the spirit of it, vary the structural features within an interpretation of the claim as would be put upon it by the skilled mechanic.

I claim:

The combination of a base member having a closed wall and an open front, a plate closing said open front, an arbor journalled in said rear wall and said plate, a gear wheel rigid with said arbor, a pointer carried by said arbor exterior to said plate, a weight on said arbor for holding the pointer in a plumb line, a second arbor journalled in said rear wall and said plate, a pinion on said second arbor, and meshing with said gear wheel, a second gear wheel on said second arbor, a third arbor journalled in said rear wall and said plate, a third gear on said third arbor, meshing with said second gear wheel, a pointer on said third arbor exterior of said plate, said plate being marked circularly with gradations about said first mentioned arbor to give readings in degrees, and being marked with gradations about said third arbor to give readings in minutes.

In testimony that I claim the foregoing I have hereunto set my hand at Milwaukee, in the county of Milwaukee and State of Wisconsin.

HARRY W. YOUNG.